July 8, 1958 A. LUCIBELLO 2,842,630
AUTOMATIC INTERRUPTER DEVICE FOR THE ELECTRICAL CIRCUIT IN
AUTOMOBILE VEHICLES IN CASE OF COLLISION
OR OVER-TURNING OF SAME
Filed Oct. 27, 1953 3 Sheets-Sheet 1

INVENTOR:
ALFONSO LUCIBELLO

July 8, 1958
A. LUCIBELLO
2,842,630
AUTOMATIC INTERRUPTER DEVICE FOR THE ELECTRICAL CIRCUIT IN
AUTOMOBILE VEHICLES IN CASE OF COLLISION
OR OVER-TURNING OF SAME
Filed Oct. 27, 1953
3 Sheets-Sheet 2
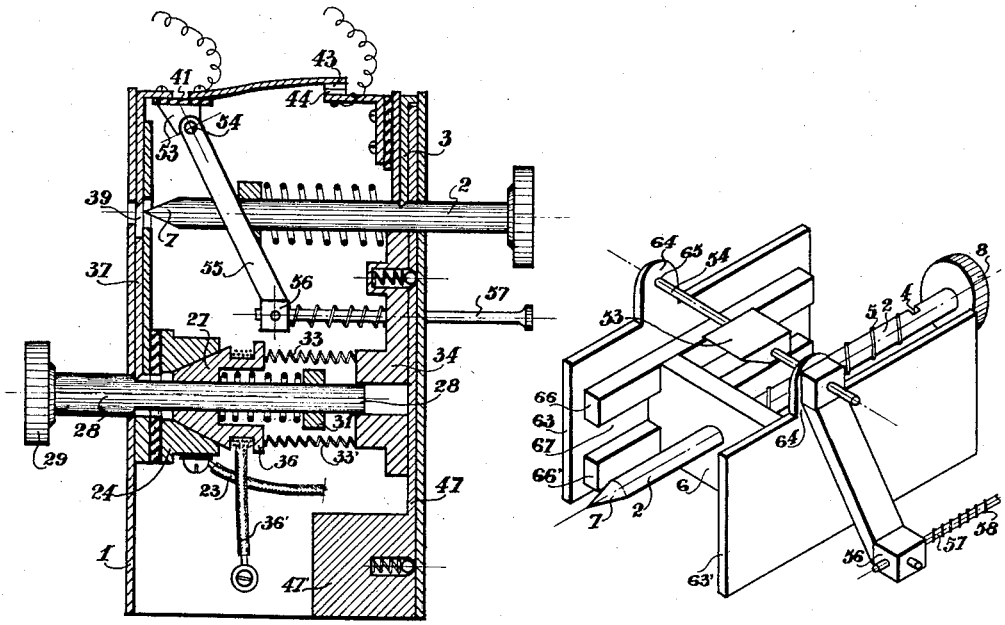
Fig. 5
Fig. 7
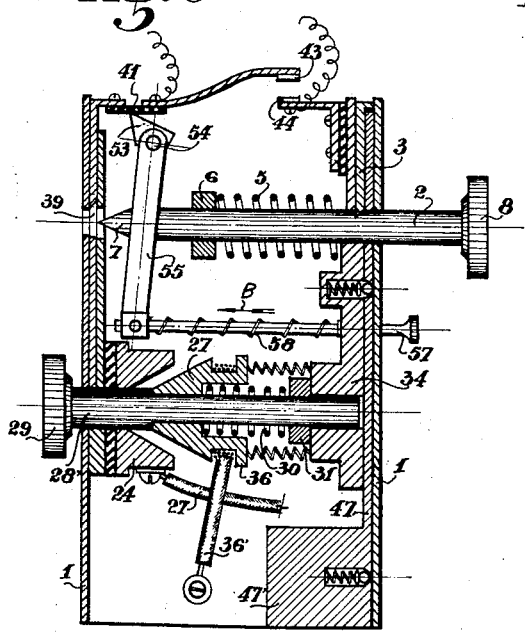
Fig. 6
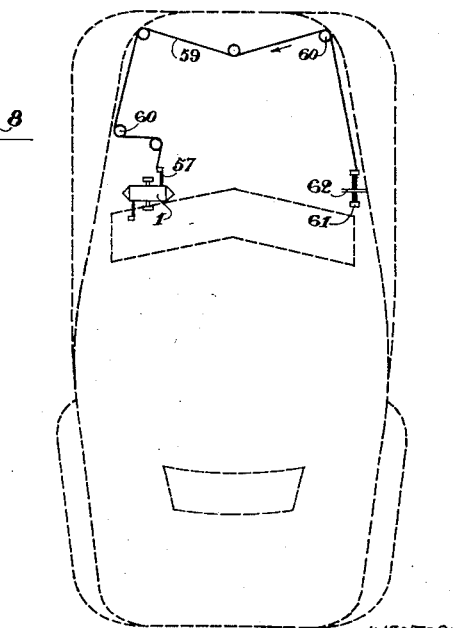
Fig. 8
INVENTOR:
ALFONSO LUCIBELLO
BY

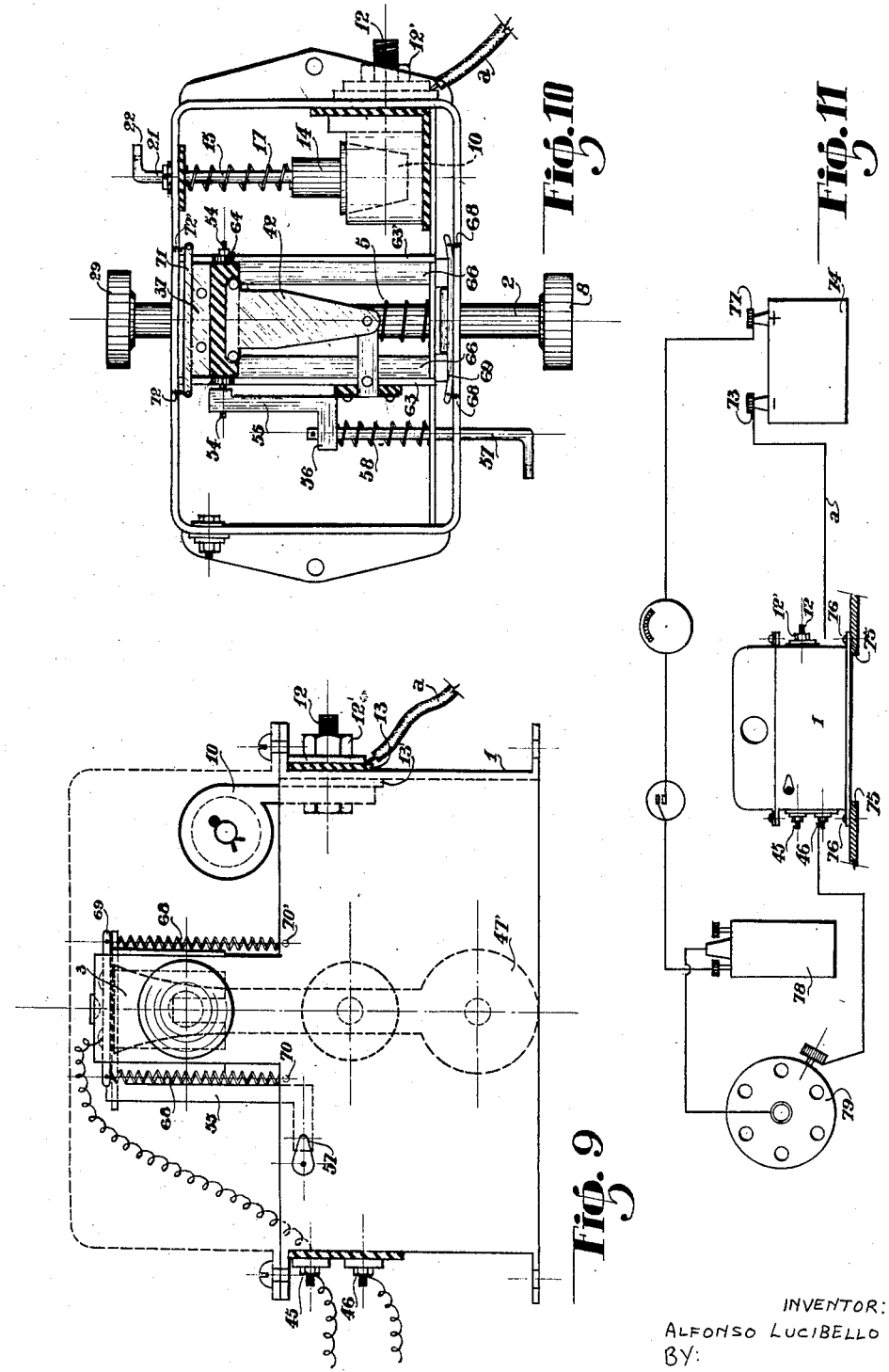

United States Patent Office 2,842,630
Patented July 8, 1958

2,842,630

AUTOMATIC INTERRUPTER DEVICE FOR THE ELECTRICAL CIRCUIT IN AUTOMOBILE VEHICLES IN CASE OF COLLISION OR OVERTURNING OF SAME

Alfonso Lucibello, Buenos Aires, Argentina

Application October 27, 1953, Serial No. 388,500

5 Claims. (Cl. 200—61.45)

The present invention refers to a security device for the automatic interruption of the electric current in automotive vehicles in case of collision or over-turning of the same and comprises a constructive arrangement destined to obtain this end by means of a simple mechanism, which is instantaneously acting.

It is well known that the greater part of fires occurring in automotive vehicles are due to sparks from the ignition or lighting circuits coming in contact with inflammable parts of the vehicle. This danger is greatly increased in the case of collisions or over-turning of the vehicles, inasmuch as the fuel tank may break, or the fuel contained in the carburetor may spill and come in contact with the spark plugs and break into flame.

It is due to these causes that a device of the type described hereafter fulfills an important need, as it will practically eliminate the fire risks in vehicles in case of accidents. It should be noted that, by use of the present invention; the electric circuit may be interrupted at will from the instrument panel of the car during the periods in which same is not in use, thereby diminishing, during these moments, the risks of a fire.

In general terms, the operation of the device is based on a pendulum which, in the case of over-turning of the vehicle, acts on two spindles or rods which are in turn connected to two sets of interrupting elements inserted respectively in the grounding circuit of the automobile battery and in the generator circuit of same. In the case of an end on collision, the operation of the said interrupters is brought about by a cable transversely disposed and conveniently tensioned in the front part of the vehicle, which on receiving the impact of the collision determines the operation of the interrupters.

In order that the present invention be clearly understood and easily put into practice, it has been presented in its preferable form of execution in the accompanying drawings, and in which.

Figure 3:
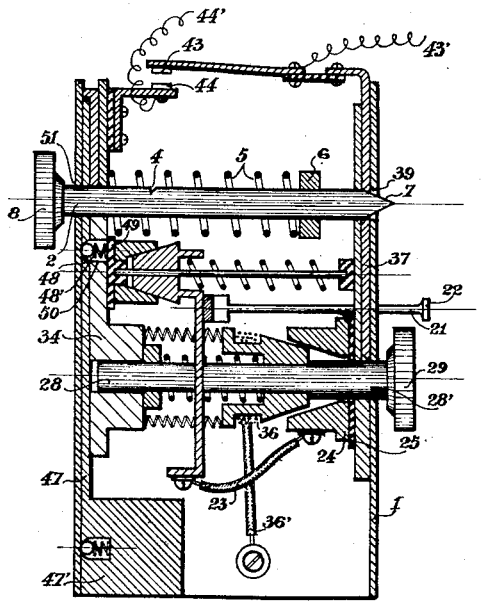

Figure 3 schematically represents a transverse section of the interrupter in an operated condition.

Figure 4:
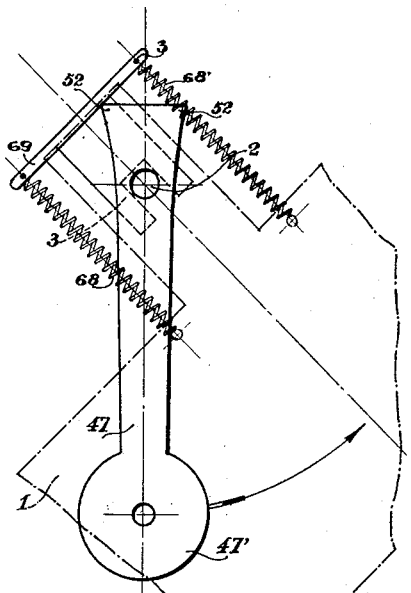

Figure 4 shows the relative positions of the pendulum and case of the device after the over-turning of the automobile has been produced.

Figure 5 shows a schematic transverse section of the apparatus, seen from its left-hand side.

Figure 6 is similar to the previous one and shows the interrupter, object of this invention, in an operated condition, in the case of a collision of the vehicle.

Figure 7 represents a perspective view of the constructive details of the device related with the oscillating lever arm which separates the platinum contacts of the interrupter inserted in the ignition circuit of the automobile.

Figure 8 illustrates in a schematic manner the disposition or arrangement of the device and its accessories in an automobile vehicle.

Figure 9 represents a front view of the device in question.

Figure 10 shows a top view of same.

Figure 11, finally, illustrates in a schematic manner the insertion of the said interrupter device in the electrical circuit of the vehicle.

In all the above mentioned figures, the same reference numbers indicate equal or equivalent parts.

With respect to these, number 1 (Figure 1) indicates the case or covering of the device, in which a rod or spindle 2, is mounted horizontally and transversely, being able to slide axially and be locked in its travel by a pawl or retaining member 3, whose bottom end rests in a notch 4 in the said rod or spindle 2.

This spindle, as has been said, can slide axially urged by the spring 5, fixed at one end on the internal wall of case 1 and at the other end on to piece 6 which is joined to, and forms part of the said spindle.

The said spindle or rod terminates at is free end, which is normally disposed in the interior of case 1, in a conical point 7, while at its other end, external to the said case, it terminates in a knob with knurled edges 8.

Underneath the spindle 2, a member 10 is mounted and insulated from the interior wall of case 1, by means of a sheet of insulating material 9, and has a truncated cone cavity 11 to which the ground cable *a* of the battery of the automobile is connected by means of the screw 12 and nut 12′, said nut 12′ being duly insulated from the case 1 of the device by the insulating elements 13 and 13′.

In the said truncated cone cavity 11 of piece 10, a member 14 lodges with a similar form as that of the said cavity and which slides along shaft 15, placed parallel with respect to the spindle 2 and insulated from the case 1, since one of its extremities lodges in piece 9 while the opposite end is fixed to a seat 16 made of insulating material.

The end of a helical spring 17 rests on this seat 16, disposed round the above mentioned shaft 15, whereas its opposite end rests in an annular cavity 18 formed in the piece 14 in its greater diameter base. It is the tension of this spring 17 which causes the above mentioned piece 14 to remain normally inserted in the cavity 11 of piece 10 establishing in this manner the electrical continuity between both pieces.

The said piece 14 has an extension or arm 19, oriented towards the lower part of the device and on which is secured a rod 21 by means of a small sheet of insulating material 20. This rod 21 projects outside of the case 1 terminating in a button or knob 22 which is connected to another similar one placed on the instrument panel of the automobile, so as to permit the manual operation of said rod, whose traction will produce the separation of the pieces 10 and 14. That is it will permit the user or owner of the car to deliberately open the ground connection of the battery circuit of the vehicle.

On the free end of the above mentioned extension 19 of piece 14, a cable 23 is fixed which by its opposite end is connected to a piece or receptacle 24, of a similar form to that of piece 14 already described, and this piece 24 is secured to the internal wall of case 1 from which it is insulated by the interposition of an insulating sheet 25. The said cable 23 therefore establishes the electrical continuity between piece 14 and the similar piece 24.

This latter, the same as its above mentioned homologous piece, has an opening or cavity 26 in the form of a truncated cone in which is tightly placed a member 27 through which a sliding spindle 28 passes and projects outside the case 1 by its greater diameter extremity 28′, and terminates in a knob with knurled edges 29. The above mentioned piece 27 is normally maintained inserted in the cavity 26 of piece 24 by means of a spring 30, one of whose extremities rests on a ring 31 joined to, and forming part of the spindle 28, and the other extremity rests in an annular recess 32 practiced on the face of greater diameter 32' of the piece 24, which is at the same time solicited by two weaker springs 33 and 33' anchored by one extremity to said face 32' of the above mentioned piece and the other extremity to a piece 34 secured to the internal wall of the case or covering of the device and having a perforation 35 in order to guide the spindle 28. The piece 27 has an annular flange 36 on its outside for the purpose of placing a cable 36' which electrically joins the piece to case 1. The spindle 28 can be locked in its axial sliding movement by a trip 37 which duly guided, slides vertically and inserts into a notch, reduction or similar element 38 made in the greater diameter part 28' of spindle 28. The above mentioned trip 37 has an opening 39 above it and made at a level corresponding to the conical point 7 of spindle 2 and is terminated in arm 40 on which is securely attached or fixed an insulating sheet 41 to which is connected an elastic sheet metal arm 42 which carries mounted on its end a contact 43. This contact 43, in the normal position of the device (Figure 1) rests on the similar fixed contact 44. The corresponding conductors 43' and 44' connect these contacts to the terminals 45 and 46 (Figure 9) which are externally fixed to case 1 and conveniently insulated from same. At the same time these terminals are inserted in the ignition circuit of the automobile, so that the separation of contacts 43 and 44, as will be explained further on, will bring about the interruption or opening of the above mentioned ignition circuit of the vehicle.

In the interior of case 1, a pendulum is placed and is constituted by an arm 47 and a pivoted weight 47'; said arm has a perforation 48 (Figure 3) in its top extremity and in whose interior a ball 48' is placed and is maintained in a hole 50 in the piece 34 by a spring 49. The object of this arrangement is to avoid false oscillations of the pendulum due to the normal movements and vibrations of the vehicle during its use. At a level above the said opening 50, the arm 47 of the pendulum has another perforation 51 constituting the zone for passing the spindle 2, and terminates above this in a bilateral flattening, that is to say, forming the lugs 52 and 52' (Figure 2) which like corresponding cams act on the pawl 3 when the case 1 of the device and its pendulum adopt the position illustrated in Figure 4.

In Figure 5 is shown a sectional schematic view of the device as seen from the right-hand side, and on said illustration may be seen, in addition to the pieces previously described, an oscillating cam 53, centered with respect to the insulating sheet 41 and solidly joined to a shaft 54 to which it is fixed. On one end of this shaft 54 is mounted one of the extremities of a lever arm 55 whose opposite end terminates in an articulated die 56 joined to a rod 57 solicited by a spring 58 and which projects externally to the case 1 of the device to be extended, by means of a tensioning steel cable 59 secured to the front part of the automobile, as is illustrated in Figure 8, duly guided by means of the pulleys 60 and capable of being tensioned by means of a screw 61 threaded on a support 62, rigidly fixed to the automobile structure, up to a point capable of making the cam 53 adopt its normal position as illustrated in Figure 5.

Figure 7 illustrates in a perspective view, the arrangement adopted in the device in order to guide the spindle 2 in its axial travel and the mounting of shaft 54 which carries the oscillating cam 53. The sheets 63 and 63' which are disposed transversally with respect to the internal opposite walls of case 1, have on the borders of their superior medial zones, the projections 64 and 64' provided with the corresponding perforations 65 and 65' through which the above mentioned shaft 54 passes. Said sheets 63 and 63' have on their facing surfaces the corresponding guides 66 and 66' on which the piece 6 slides, and which has laterally the respective conjugate extremities with the corresponding contour 67 and 67' limited by the said guides, this piece 6 serving furthermore as a seat for one of the ends of spring 5 wound around the spindle 2.

Figure 9 shows the device as viewed from the front (in its normal position in the vehicle and seen from the front part of same). In this figure the springs 68 and 68' joined at the top to the yoke 69 of the pawl 3 can be seen. These springs are also joined at the bottom to the perforations 70 and 70' practiced in the case 1. Said springs solicit the above mentioned pawl 3 so as to propitiate the blocking action on the spindle 2.

Piece 37 has a yoke 71, similar to the above described one (Figure 10), on whose extremities the springs 72 and 72' are anchored and which accomplish similar functions as to the one labelled 68 and 68'.

Figure 11 represents schematically the insertion of the interrupter device in the electrical circuit of the automobile, having omitted in this drawing all the unnecessary elements for the present description:

From the negative terminal 73 of the battery 74, a cable $a$ is taken to the terminal constituted by the screw 12 and the nut 12' of the interrupter device, so that the vehicle battery is normally connected to chassis or ground, through the device since its case 1 is secured to the metallic structure 75 of the vehicle by means of the screws 76 and 76' (see Figure 11). The positive terminal 77 of the battery is electrically connected through the ammeter, interrupting switch and other accessories to the ignition coil 78 and from this to terminal 46 of the interruptor device; the distributor 79 and the normal connections thereof closing the circuit to terminal 46 of the said device.

Figure 1:
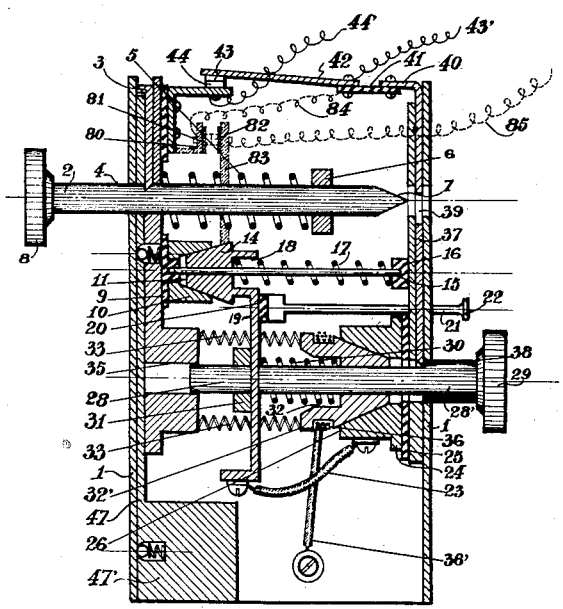
Figure 1 shows a schematic view of a transverse section of the interrupting device, seen from its right-hand side.

In Figure 1, a further improvement has been shown by dotted lines, whereby the ignition circuit of the automobile may be manually interrupted and for which purpose the connection 43' must be completely eliminated and replaced by the following: An extension 80 of the supporting bracket for contact 44 which will carry a contact 81 conveniently insulated from the extension bracket 80 and at the same time connected to the arm 42 by means of a flexible conductor 84. On the other hand an arm 83 solidly attached to piece 14 by one end and on the other end and facing contact 81, carrying contact 82 likewise conveniently insulated from arm 83 and connected in circuit by means of the conductor 85. With this disposition the contacts 43—44 are in series in the ignition circuit with the contacts 81—82.

*Operation.*—As a first measure and in order to place the interruptor in its normal working position, it is necessary that the automobile in which the above mentioned device is going to be mounted be in a horizontal position, and that the steel cable 59 is duly tensioned so that the top face of the oscillating cam 53 remains horizontal in order to admit the descent of the trip 37.

The spindles 2 and 28 are then pulled out so that the trips 3 and 37, solicited by their corresponding springs are made to come down and engage in the corresponding notches provided in the said spindles and in accordance with the disposition illustrated in Figure 1.

Under these conditions, the ground connection of the circuit commences at cable $a$ which goes to the screw 12 and its nut 12' (Figure 9). The circuit then continues through piece 10 and its opposite piece 14, and from this latter to the cable 23 which is connected to the receptacle piece 24, in contact with its opposite piece 27, from which through cable 36', the circuit to ground is closed since said cable is electrically joined to the case or covering 1 of the device, which in turn is connected to the metallic part of the automobile. It can be observed furthermore in Figure 1 that when the trip 37 is wedged in the corresponding notch of the spindle, the platinum contacts 43 and 44 rest one against the other, therefore establishing the electrical continuity of the ignition circuit of the automobile, since the said contacts are connected to terminals 45 and 46 of the interrupter by means of the conductors 43' and 44' respectively.

Figure 2:
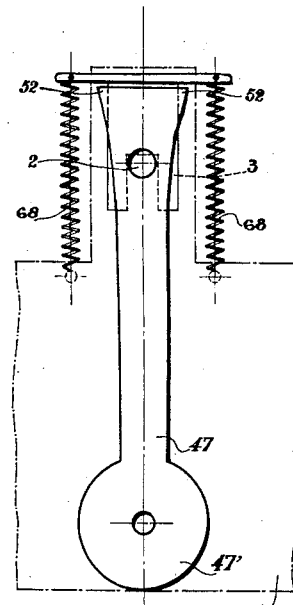
Figure 2 illustrates the relative position of the pendulum and case or covering of the interrupter, in its normal position.

Under these conditions, the vertical shafts of the case of the device and of the pendulum, maintain a coincident position, as can be seen in the illustration of Figure 2. In the case of a collision taking place which brings about the overturning of the automobile, it is evident that the case of the interruptor will accompany the car in the over-turning movement, while the pendulum, due to the effects of its pivoted weight tends to maintain a vertical position, oscillating around its shaft 2 (see Figure 4, in which the relative position of both is illustrated on initiating the over-turning), producing an angle between the two shafts of the interrupter and pendulum, which will reach a value of 90° when the vehicle rests totally on one of its sides. Before this occurs, that is to say, when the above mentioned angle reaches the value of approximately 75°, the lug 52 or 52' of the upper end of the arm of the pendulum in accordance with the direction of over-turning, will lift the pawl 3, whose wedge will leave the notch of the spindle 2 (Figure 3), which, solicited by the spring 5, will slide axially against the opposite face of case 1, wherewith the sharp conical point 7 of this spindle will connect and wedge in the perforation 39 of the trip 37 obliging it to ascend vertically and consequently liberating the detention which said trip exerted on the spindle 28. The spindle 28 now moves solicited by the spring 30, against the opposite face of the above mentioned case 1 and whereby the greater diameter extremity 28' of same will bring about the separation of the piece 27 from the receptacle 24, while springs 33 and 33' hold the first avoiding its ulterior movement. In this manner the circuit to ground or chassis of the battery of the automobile is interrupted, and at the same time that the trip 37 ascends it determines the separation of the contacts 43 and 44, which brings about the opening of the ignition circuit of the said automobile. For the cases of end-on collisions of the vehicle and although the effects produced in the interrupter device are identical to the ones previously described, the mechanism takes place by means of different elements, as can be noted in Figures 5 and 6. In effect, the device being in its normal working position, that is to say, with its two sliding spindles in the retained position (Figure 1) and with the upper face of the oscillating cam 53 in a practically horizontal position (Figure 5) so that it does not establish contact actually with the insulating piece 41, the trip 37 is held in the wide part of 28' of the spindle 28 and the separating space between both can be varied by tensioning the cable 59 (Figure 8), whereby the sensitivity is adjusted in this respect of the interrupter device. On producing the end-on collision, it is evident that the magnitude and importance of same can vary considerably. If it were a minor collision and little damage was produced in the automobile, it would not be convenient for the motor to stop working and thereby prevent the possibility of maneuvering in order to avoid further risks. On the other hand if the collision were of sufficient violence to appreciably deform the front part of the vehicle, and therefore susceptible of breaking the fuel feed line, carburetor, etc., as also the insulation of the cables of the different electrical circuits of the vehicle, producing sufficient arcing to bring about the ignition of the fuel and capable of producing a fire, the automatic protection provided by the device is logically warranted in respect to the total interruption of the electrical circuits of the said automobile.

It is therefore clear that, colliding end-on and deforming the metallic front part of same, some of the small pulleys 60 (Figure 8), will be displaced inwardly, loosening the cable 59 and determining the axial displacement of the rod 57, solicited by its spring in the direction indicated by the arrow *b* (Figure 6), which will impulse the lever arm 55 which in turn will make the shaft 54 turn to lift the oscillating cam 53 bringing about the elevation of trip 37 which liberates the spindle 28 and with which a similar effect is obtained to that described for the case in which the sharp conical point 7 of spindle 2 produced a like action.

It must be noted, furthermore, that while the vehicle remains overturned or deformed by a collision, it is impossible to re-establish the electrical continuity of its ground and ignition circuits.

It should be pointed out lastly, that in vehicles driven by diesel type motors, the interrupter device constituted by the platinum contacts 43 and 44 shall be naturally inserted in the generator circuit.

Having brought out the positive improvements of a practical and functional order of this interrupter device, it only remains to say that the realization example illustrated for same is in no way limitative, inasmuch as said invention will admit constructive modifications and in details within the scope corresponding to it without deflecting from the limits and scope of the following claims.

Having described the present invention and the manner in which the same may be put into practice, the following claims are declared to be of the exclusive right and property of the inventor:

1. Apparatus for automatically opening an electrical circuit in an automotive vehicle comprising, in combination, a housing adapted to be mounted on said vehicle and having at least one opening in the walls thereof; a first switch arranged on said housing, connected in said electrical circuit and movable between circuit opening and circuit closing positions; a first switch operating member movably mounted on said housing for moving said switch between its circuit opening and circuit closing positions upon actuation thereof, said switch operating member having at least one opening therethrough adapted to be moved into registration with said opening of said housing wall upon actuation thereof; a switch actuating member movable between a first position out of engagement with said first switch operating member and a second position wherein said switch actuating member engages said first switch operating member and moves the same and said switch into circuit opening position, said switch actuating member having an elongated portion adapted to communicate with said openings in said switch operating member and said housing for moving the same into registration with each other when said switch actuating member engages said switch operating member, said elongated portion of said switch actuating member thereby maintaining said operating member and said switch in circuit opening position; spring means permanently urging said switch actuating member into its second position; holding means normally holding said switch actuating member in its first position against the action of said spring means, said holding means being movable between said normal holding position and a releasing position wherein said switch operating member is released; and releasing means pivotally mounted on said housing for moving said holding means into its releasing position when pivoted whereby said switch actuating member moves into engagement with said switch operating member to initiate operation of the same so that said switch operating member moves said first switch into its circuit opening position for automatically opening said electrical circuit and said switch is maintained in said circuit opening position by the cooperation of said elongated portion of said switch actuating member and said registered openings in said operating member and said housing wall.

2. Apparatus as claimed in claim 1 wherein said first switch operating member has a second opening in communication with a second opening in said housing wall; a second switch arranged on said housing and connected in said electrical circuit and movable between circuit opening and circuit closing positions; a second switch operating member connected to said second switch and movable between a first position wherein said second switch is in said circuit closing position thereof and a second position wherein said second switch is moved into said circuit opening position thereof, said second switch operating member communicating with said second opening of said first switch operating member and said housing, said second switch operating member being normally held in its first position by said first switch operating member; and second spring means normally urging said second switch operating member into its second position against the holding action of said first switch actuating member whereby the movement of said first switch operating member into the circuit opening position of said first switch releases said second switch operating member and causes the same to move said second switch into circuit opening position.

3. Apparatus as claimed in claim 1 wherein a switch opening member is pivotally mounted adjacent said first switch for moving the same into its circuit opening position when said switch opening member is pivoted; cable means connected to said switch opening member; and cable operating means for placing said cable means under a predetermined tension whereby when the tension of said cable means is decreased below a predetermined value said cable operating means tends to increase said tension and thereby pivots said switch opening member to move said first switch into its circuit opening position.

4. Apparatus as claimed in claim 2 wherein a switch opening member is pivotally mounted adjacent said first switch for moving the same into its circuit opening position when said switch opening member is pivoted; cable means connected to said switch opening member; and cable operating means for placing said cable means under a predetermined tension whereby when the tension of said cable means is decreased below a predetermined value said cable operating means tends to increase said tension and thereby pivots said switch opening member to move said first switch into its circuit opening position.

5. An apparatus as claimed in claim 4 wherein said first switch and said first switch operating member are fixedly connected so that the movement of said first switch into its circuit opening position moves said first switch operating member and releases said second switch operating member to cause the same to move said second switch into its circuit opening position.

References Cited in the file of this patent

UNITED STATES PATENTS

| | | |
|---|---|---|
| 1,530,400 | Pagano | Mar. 17, 1925 |
| 1,890,233 | Phillips | Dec. 6, 1932 |
| 1,901,554 | De Wilde | Mar. 14, 1933 |
| 2,010,897 | Rodel | Aug. 13, 1935 |
| 2,027,709 | Slebos | Jan. 14, 1936 |
| 2,156,946 | Closson et el. | May 2, 1939 |
| 2,171,457 | Schuyler | Aug. 29, 1939 |
| 2,202,043 | Cale | May 28, 1940 |
| 2,273,058 | Miller | Feb. 17, 1942 |
| 2,511,959 | Williams | June 20, 1950 |